United States Patent [19]
Le Salver et al.

[11] Patent Number: 4,871,150

[45] Date of Patent: Oct. 3, 1989

[54] ELASTICALLY YIELDABLE SUPPORT IN PARTICULAR FOR THE SUSPENSION OF A VEHICLE ENGINE

[75] Inventors: Robert Le Salver, Chanteloup Les Vignes; Domunique Poupard, Chaville, both of France

[73] Assignees: Automobiles Peugeot, Paris; Automobiles Citroen, Neuilly/Seien, both of France

[21] Appl. No.: 294,981

[22] Filed: Jan. 9, 1989

Related U.S. Application Data

[63] Continuation of Ser. No. 145,879, Jan. 20, 1988, abandoned.

[30] Foreign Application Priority Data

Jan. 20, 1987 [FR] France .................... 87 00589

[51] Int. Cl.⁴ .................... B60K 5/12; F16F 13.00; F16M 4/00
[52] U.S. Cl. .................... 267/140.1; 248/562; 248/636; 267/140.3; 267/14.05; 267/141; 267/153; 267/219; 267/293
[58] Field of Search ........ 267/219, 220, 153, 151–152, 267/292–294, 139–140, 140.1–141.7, 121–123, 35; 92/103, 98; 280/710, 712; 180/300, 312, 902; 248/631, 636, 562, 632

[56] References Cited

U.S. PATENT DOCUMENTS

| | | | |
|---|---|---|---|
| 2,226,388 | 12/1940 | Richter | 74/607 |
| 2,387,066 | 10/1945 | Harding | 248/358 |
| 2,540,130 | 2/1951 | Lee | 248/358 |
| 2,562,195 | 7/1951 | Lee | 248/358 |
| 2,926,881 | 3/1960 | Painter | 248/358 |
| 3,013,920 | 12/1961 | Harris et al. | 92/103 F X |
| 3,154,273 | 10/1964 | Paulsen | 267/122 X |
| 3,202,388 | 8/1965 | Goodwin | 248/8 |
| 3,586,403 | 6/1971 | Cooley | 308/187.1 |
| 3,642,268 | 2/1972 | Hipsher | 267/57.1 |
| 3,651,902 | 3/1972 | Peddinghaus | 188/269 |
| 3,731,771 | 5/1973 | Borgo | 188/289 |
| 3,795,390 | 3/1974 | Kendall et al. | 267/33 |
| 3,958,654 | 5/1976 | LeSalver et al. | 180/64 R |
| 3,970,162 | 7/1976 | LeSalver et al. | 180/64 R |
| 4,054,277 | 10/1977 | Sirven | 267/35 |
| 4,159,091 | 6/1979 | LeSalver et al. | 248/562 |

(List continued on next page.)

FOREIGN PATENT DOCUMENTS

| | | |
|---|---|---|
| 0005730 | 11/1979 | European Pat. Off. . |
| 0014742 | 9/1980 | European Pat. Off. . |
| 0027751 | 4/1981 | European Pat. Off. . |
| 0036470 | 9/1981 | European Pat. Off. . |
| 0044908 | 2/1982 | European Pat. Off. . |
| 0072262 | 2/1983 | European Pat. Off. . |
| 0091246 | 10/1983 | European Pat. Off. . |
| 0139261 | 5/1985 | European Pat. Off. . |
| 0147242 | 7/1985 | European Pat. Off. . |
| 0148387 | 7/1985 | European Pat. Off. . |
| 0149080 | 7/1985 | European Pat. Off. . |
| 0154268 | 9/1985 | European Pat. Off. . |
| 0163817 | 12/1985 | European Pat. Off. . |
| 0209883 | 1/1987 | European Pat. Off. . |
| 0213324 | 3/1987 | European Pat. Off. . |
| 0242254 | 10/1987 | European Pat. Off. ............ 180/312 |
| 547194 | 2/1934 | Fed. Rep. of Germany . |
| 728501 | 11/1942 | Fed. Rep. of Germany . |

(List continued on next page.)

Primary Examiner—Douglas C. Butler
Attorney, Agent, or Firm—Burns, Doane, Swecker & Mathis

[57] ABSTRACT

The support has a generally annular shape and a fixing device extends axially therethrough. It comprises an annular elastically yieldable mass connected to two frames, a semi-toric membrane fixed between the two frames and defnining with the outer surface of the mass a work chamber (A). This chamber communicates with an expansion chamber (B) through a passageway. The support also includes a device for limiting its axial and radial movements. Such a support has a particularly low natural stiffness both in the radial direction and in the transverse direction, which improves the filtering of high frequency vibrations while affording a good damping of trepidations of low frequency and large amplitude.

12 Claims, 1 Drawing Sheet

U.S. PATENT DOCUMENTS

| | | | |
|---|---|---|---|
| 4,191,398 | 3/1980 | Willetts | 267/35 X |
| 4,211,429 | 7/1980 | Howard | 267/219 X |
| 4,215,842 | 8/1980 | Brenner et al. | 248/562 |
| 4,262,886 | 4/1981 | LeSalver et al. | 267/8 R |
| 4,274,655 | 6/1981 | Lederman | 280/688 |
| 4,277,056 | 7/1981 | Ticks | 267/140.1 |
| 4,319,768 | 3/1982 | Youngdale | 280/668 |
| 4,336,968 | 6/1982 | Hibner | 308/26 |
| 4,389,045 | 6/1983 | Taylor | 267/219 |
| 4,422,779 | 12/1983 | Hamaekers et al. | 384/99 |
| 4,510,818 | 4/1985 | Inui | 74/477 |
| 4,519,211 | 5/1985 | Sedille et al. | 60/602 |
| 4,568,069 | 2/1986 | Poupard | 267/140.1 |
| 4,573,656 | 3/1986 | Yoshida et al. | 248/562 |
| 4,588,173 | 5/1986 | Gold et al. | 267/140.1 |
| 4,603,844 | 8/1986 | Chen | 267/152 X |
| 4,630,803 | 12/1986 | Werner et al. | 267/35 X |
| 4,657,232 | 4/1987 | West | 267/140.1 |
| 4,673,156 | 6/1987 | Tabata | 248/559 |
| 4,679,777 | 7/1987 | Gold et al. | 267/140.1 |
| 4,679,778 | 7/1987 | Tabata et al. | 267/140.1 |
| 4,688,662 | 8/1987 | Correll | 188/268 |
| 4,720,086 | 1/1988 | LeSalver et al. | 267/140.1 |
| 4,733,854 | 3/1988 | Miyamoto | 267/140.1 |
| 4,767,106 | 8/1988 | Le Fol | 267/140.1 |
| 4,767,107 | 8/1988 | Le Fol | 267/140.1 |
| 4,768,760 | 9/1988 | Le Fol | 267/140.1 |

FOREIGN PATENT DOCUMENTS

| | | | |
|---|---|---|---|
| 1124832 | 3/1962 | Fed. Rep. of Germany | 267/35 |
| 1625389 | 7/1970 | Fed. Rep. of Germany | |
| 7407909 | 5/1977 | Fed. Rep. of Germany | |
| 2948408 | 6/1981 | Fed. Rep. of Germany | |
| 0071698 | 2/1983 | Fed. Rep. of Germany | |
| 3245653 | 6/1984 | Fed. Rep. of Germany | |
| 3414547 | 10/1985 | Fed. Rep. of Germany | |
| 3610611 | 10/1987 | Fed. Rep. of Germany | |
| 926846 | 4/1947 | France | |
| 1189778 | 10/1959 | France | |
| 1242350 | 8/1960 | France | |
| 1336186 | 7/1963 | France | |
| 1380784 | 10/1964 | France | |
| 1540380 | 8/1968 | France | |
| 1549300 | 11/1968 | France | |
| 2332151 | 6/1977 | France | |
| 2349066 | 11/1977 | France | |
| 2394715 | 1/1979 | France | |
| 2435632 | 4/1980 | France | |
| 2555272 | 11/1984 | France | |
| 2547378 | 12/1984 | France | |
| 56-143830 | 11/1981 | Japan | |
| 58-72741 | 7/1983 | Japan | |
| 59-11731 | 1/1984 | Japan | |
| 59-37348 | 2/1984 | Japan | |
| 59-183565 | 10/1984 | Japan | |
| 60-14066 | 1/1985 | Japan | |
| 60-157538 | 8/1985 | Japan | |
| 60-172743 | 9/1985 | Japan | |
| 0179543 | 9/1985 | Japan | 267/220 |
| 60-113836 | 10/1985 | Japan | |

ELASTICALLY YIELDABLE SUPPORT IN PARTICULAR FOR THE SUSPENSION OF A VEHICLE ENGINE

This application is a continuation of application Ser. No. 07/145,879, filed Jan. 20, 1988, now abandoned.

The present invention relates to elastically yieldable supports adapted to be interposed between a vibrating mechanical unit, for example a vehicle power unit, and another unit, for example the structure of this vehicle.

More precisely, the invention is applicable to any elastically yieldable support of the type comprising a mass of elastomeric material, of annular shape disposed between two frames of which one is adapted to be connected to one of the two units and the other is adapted to be connected to the other unit through a fixing element which extends throughout the support along its axis, at least one annular chamber filled with fluid being partly defined by the mass of elastomeric material.

It is known that these supports having an axial fixing element extending therethrough have owing to their design a stiffness which is greater than that of comparable supports without the axial element extending therethrough.

An object of the invention is to provide such a support which has, both in the radial direction and in the transverse direction, a natural stiffness which is not greater than that of a support which does not have an axial fixing element extending therethrough, so as to improve the filtering of vibrations at high frequency while retaining a good damping of trepidations having a low frequency and large amplitudes.

It will be recalled that the natural stiffness of a hydroelastic support may be defined as being the stiffness measured at constant interior pressure.

For this purpose, the invention provides an elastically yieldable support of the type defined hereinbefore, wherein the annular chamber is radially inwardly defined by the mass of elastomeric material and outwardly defined by a flexible membrane of substantially semi-toric shape connected to a sealed manner to each of said frames.

According to other features of the invention:

the membrane is made from an elastomeric material reinforced with textile or metal threads oriented in directions which are inclined relative to the axis X—X of the support;

said directions are inclined at angles less than 30° relative to the axis of the support;

one of the frames comprise a plate provided with a central orifice and two frame members respectively fixed to the inner periphery and to the outer periphery of said plate and including concentric cylindrical portions, an elastically yieldable annular wall being fixed between said two frame members for defining a second annular chamber;

a rigid annular member is disposed in the second chamber against the plate and defines with the plate a passageway which communicates at circumferentially spaced apart points on one hand with the first annular chamber and on the other hand with the second annular chamber.

The invention will be described in more detail hereinafter with reference to the accompanying drawings in which.

Figure 1:
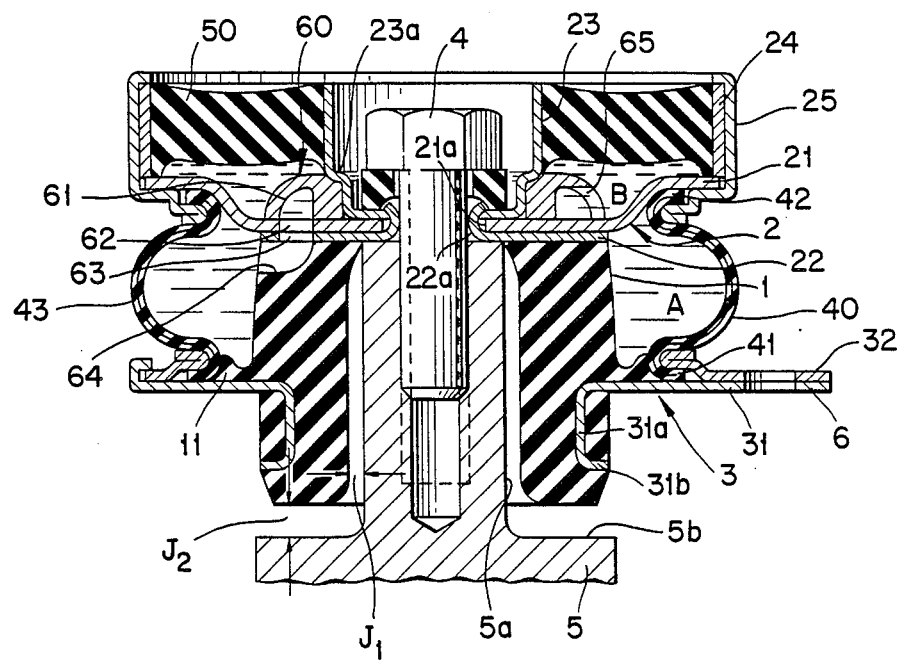
FIG. 1 is an axial sectional view of a support arranged in accordance with the invention.
Figure 2:
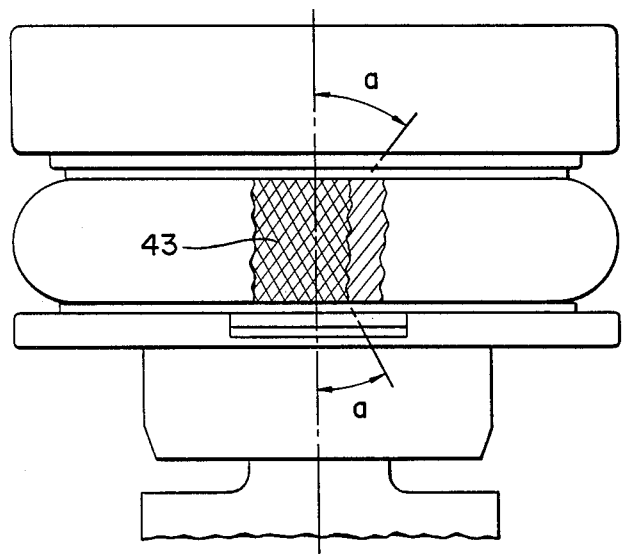
FIG. 2 is an outer elevational view of said support.

This support having an axis X—X comprises an electrically yieldable body 1 made from rubber or some other elastomer, and having a generally annular shape. This body is disposed between two metal frames 2 and 3 adapted to be connected respectively to one of the two units (not shown) between which the support must be interposed. These two frames extend generally in a direction perpendicular to the axis X—X. In the illustrated embodiment, the frame 2 may be for example connected by a screw 4 and an intermediate central member 5 to an engine while the frame 3 may be connected to the structure of the vehicle by lugs 6.

The frame 2 is composed, in the illustrated embodiment, of a plurality of members: a cup-shaped plate 21 provided with a central orifice 21a, a plate 22 to which is bonded or vulcanized the upper surface of the mass of elastomer, two generally cylindrical frame members 23, 24 disposed concentrically with the axis X—X, and an annular member 25 achieving in particular the assembly between the plate 21 and the frame 24. The frame member 23 is rendered rigid with the plate 21 and the plate 22 by any suitable means, for example by the forming over of the inner plate portion 22a of the plate 22.

The frame 3 is in the presently-described embodiment made from two parts 31, 32 which are assembled by a forming over or setting operation, the main part 31 having the shape of a plate which is press-formed in its central portion so as to define a cylindrical skirt 31a and an outwardly extending flange 31b, this skirt and flange being embedded in the mass of elastomer.

A membrane 40 of semi-toric shape is disposed concentrically around the elastically yieldable body 1 and the ends of this membrane are respectively connected on one hand to the frame 2 and on the other hand to the frame 3. For this purpose, in one embodiment, the lower edge portion 41 (as viewed in the drawing) of the membrane is gripped between the plates 31, 32 of the frame 3. Likewise, the upper edge portion 42 of the membrane is gripped between the plate 21 and the lower edge portion of the member 25.

The membrane 40 is preferably made from rubber reinforced with metal or textile threads 43 oriented in directions which are inclined relative to the axis X—X. The angle of inclination a is less than 30°.

A work chamber A is in this way defined between the outer wall of the mass of elastomer, the two frames 2, 3 and the elastically yieldable membrane 40. It will be indeed considered that the frame 3 participates in the defining of the chamber A even if in the present instance the mass of elastomer includes a bead 11 which extends radially to the membrane 40 and covers the plate 31.

The support is completed in its upper part by an elastically yieldable wall 50 of rubber or elastomer disposed between the two frames 23 and 24 and defining with the upper part of the plate 21 an expansion chamber B.

A member 60 having a general shape of revolution and made from a rigid material, is disposed concentrically with the axis X—X above the plate 21. It is maintained in position by a step 23a in the inner frame member 23. This member 60 defines an annular passageway 61 which communicates, on one hand, with the work chamber A through orifices 62, 63 provided in the plate 21 and the plate 22 and a notch 64 in the mass of elastomer and, on the other hand, with the expansion chamber B through an opening 65 provided in the lateral wall of the member 60. This member defines with the adjacent surface of the plate 21 a conduit in respect of which the ratio between the length and the main transverse dimension is relatively large (in the known manner), this passageway providing a connection between the chambers A and B which are filled with a hydraulic fluid.

The movements of this support in the radial and axial directions are limited in the following manner:

a radial clearance j1 is provided between the inner wall of the mass of elastomer 1 and the adjacent surface 5a of the member 5;

an axial clearance j2 is defined between the lower end (as viewed in the drawing) of the mass of elastomer 1 and the adjacent part 5b of the member 5; the taking up of this clearance limits the axial movements in one direction;

the axial movement in the opposite direction is limited simply by the compression of the elastically yieldable body 1 between the two frames 2 and 3.

The operation of this support is generally similar to that of known hydroelastic supports of the same type. However, the following features should be noted:

The work chamber A is put under pressure when the support is subjected to a static load so as to put the membrane 40 under tension. The dynamic pressures created by the axial movements of one of the frames 2, 3 with respect to the other cause this tension to vary. The arrangement of the reinforcing threads close to the radial planes affords high resistance to pressure owing to the fact that these threads are put under tension. On the other hand, it affords high flexibility in respect of axial and radial displacements: upon relative displacements in the axial direction, a modification occurs in the radius of curvature of the fibres or of the threads which have a constant length which upon radial movements, a rolling or unrolling motion of the membrane occurs. In both cases, the threads are not subjected to tensile stress which imparts the flexible characteristic of the membane in respect of these movements.

As a modification, the membrane may be made from a thermoplastic material having low hardness, for example from polyurethane, the essential feature being that this membrane, owing to its shape and the nature of the material from which it is made, has a very high natural voluminal stiffness/stiffness.

In this way, there is obtained a support having an axial fixing element extending therethrough which has a natural stiffness as low as a comparable support without an axial fixing element extending therethrough, both in the axial direction and in the transverse direction, which results in an improvement in the filtering of the high frequency vibrations. Furthermore, this support provides a good damping of trepidations at low frequency and relatively high amplitude.

It will be recalled that, in the present case in which the membrane 40 partly defines the chamber A between two rigid frames 2, 3, the natural stiffness of this membrane 40 is its stiffness when the chamber A is maintained at a constant interior pressure, while its voluminal stiffness is the difference between the stiffness when the chamber A is maintained at a constant interior volume and the stiffness when the chamber A is maintained at a constant interior pressure.

Moreover, it is of simple construction and the work and expansion chambers are sealed before the fixing elements constituted by the element 5 and the screw 4 is placed in position.

The design of the support also permits access to the central fixing means from one side or the other, depending on mounting requirements.

I claim:

1. An elastically yieldable support for interposition between two units, such as a power unit and the structure of an automobile vehicle, said support comprising an axis and two frames of which frames one is adapted to be connected to one of said two units and a fixing element which extends throughout the support along the axis of the support is provided for fixing the other frame to the other unit, a mass composed of an elastomeric material of annular shape and disposed between said two frames, at least two annular chambers filled with hydraulic liquid, at least one passageway between the two annular chambers, one of said chambers being radially inwardly defined by said mass of elastomeric material, and being radially outwardly defined by a flexible membrane of substantially semi-toric shape connected in a sealed manner to each of said frames.

2. An elastically yieldable support according to claim 1, wherein the membrane is made from an elastomeric material reinforced with threads oriented in directions which are inclined relative to said axis of the support.

3. An elastically yieldable support according to claim 2, wherein said threads are of textile.

4. An elastically yieldable support according to claim 2, wherein said threads are of metal.

5. A elastically yieldable support according to claim 2, wherein said directions are inclined at angles no more than 30° relative to said axis of the support.

6. An elastically yieldable support according to claim 1, wherein said elastically yieldable mass comprises a radial bead against which said membrane bears in the region of at least one of said two frames.

7. An elastically yieldable support according to claim 1, wherein said elastically yieldable mass is spaced from said fixing element by a radial clearance and an axial clearance for limiting radial and axial movements of the support.

8. An elastically yieldable support for interposition between two units, such as for example a power unit and the structure of an automobile vehicle, said support comprising an axis and two frames of which frames one is adapted to be connected to one of said two units and a fixing element which extends throughout the support along the axis of the support is provided for fixing the other frame to the other unit, a mass composed of an elastomeric material of annular shape and disposed between said two frames, at least one annular chamber filled with fluid radially inwardly defined by said mass of elastomeric material, and a flexible membrane of substantially semi-toric shape connected in a sealed manner to each of said frames and radially outwardly defining said annular chamber, and wherein one of the frames comprises a plate having a central orifice, the plate consequently having an outer periphery and an inner periphery, and two frame members fixed respectively to said inner periphery and said outer periphery of said plate and including concentric cylindrical portions, an elastically yieldable annular wall being fixed between said two frame members and defining a second annular chamber.

9. An elastically yieldable support according to claim 8, wherein a common member fixes to said plate the membrane and the frame member located on said outer periphery of said plate.

10. An elastically yieldable support according to claim 8, wherein said frame members are fixed to said plate by a forming-over operation.

11. An elastically yieldable support according to claim 8, wherein a rigid annular member is disposed in said second chamber against said plate and defined with said plate a passageway which communicates at two circumferentially spaced-apart points respectively with said first annular chamber and with said second annular chamber.

12. An elastically yieldable support according to claim 11, wherein a step in said frame member fixed to said inner periphery of said plate maintains said rigid annular member axially against said plate.

* * * * *